(12) United States Patent
Salter (10) Patent No.: US 12,256,856 B2
(45) Date of Patent: Mar. 25, 2025

(54) BEVERAGE CAN HANDLE AND METHOD

(71) Applicant: Jeremy Graham Salter, Golden, CO (US)

(72) Inventor: Jeremy Graham Salter, Golden, CO (US)

( * ) Notice: Subject to any disclaimer, the term of this patent is extended or adjusted under 35 U.S.C. 154(b) by 418 days.

(21) Appl. No.: 17/691,701

(22) Filed: Mar. 10, 2022

(65) Prior Publication Data

US 2023/0284810 A1    Sep. 14, 2023

(51) Int. Cl.
*A47G 23/02* (2006.01)
*B33Y 80/00* (2015.01)

(52) U.S. Cl.
CPC .......... *A47G 23/0266* (2013.01); *B33Y 80/00* (2014.12)

(58) Field of Classification Search
CPC ............................ A47G 23/0266; B33Y 80/00
See application file for complete search history.

(56) References Cited

U.S. PATENT DOCUMENTS 6,244,461 B1 *   6/2001   Roberts .............. A47G 23/0233
                                                                220/741

* cited by examiner

*Primary Examiner* — Rick K Chang
(74) *Attorney, Agent, or Firm* — Sarah Brashears (57) ABSTRACT

The present disclosure provides a convenient reusable handle device for a beverage can, which firmly holds the beverage can and makes it easy to carry. The beverage can handle device comprises an upper or top portion, a middle or handle portion and a lower or base portion, where the shapes of the top and base portions of the beverage can handle device are matched to that of the top rim and bottom rim, respectively, of the beverage can, so as to engage and clasp securely the beverage can. The base of the beverage can handle device is configured to linearly traverse the bottom diameter of the beverage can in a single direction when the base is contracted and to linearly traverse the bottom diameter of the beverage can in two directions (e.g., substantially perpendicular directions in a "scissor hinge") when the base is expanded.

29 Claims, 5 Drawing Sheets

BEVERAGE CAN HANDLE AND METHOD

FIELD OF THE INVENTION

The present disclosure provides a convenient attachable, detachable and reusable holder for a beverage can, where the beverage can holder firmly engages the beverage can and makes the beverage can easy to carry.

SUMMARY OF THE INVENTION

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description including those aspects illustrated in the accompanying drawings and defined in the appended claims.

The present disclosure provides a convenient attachable, detachable and reusable holder for a beverage can, where the beverage can holder attaches and detaches from the beverage can easily, yet when in place firmly secures the beverage can and provides security from tipping or jostling. Conventional beverage cans do not offer a drinker a substantial grip; further, beverage can handles known the art fail to provide the drinker a comfortable handle with which to hold the can or a configuration that grasps the can securely. The beverage can handle can be fabricated in different sizes to hold cans of different sizes, including but limited to beverage can handles for, e.g., 5.5 oz., 8 oz., 12 oz., 16 oz., 24 oz., and 40 oz. cans popular in the United States, as well as beverage can handles for 330 ml, 355 ml, 375 ml, 440 ml, 500 ml, and 568 ml cans popular in other countries.

Thus, in one embodiment, there is provided a C-shaped beverage can handle device that may be removably attached to a beverage can comprising: a vertical handle portion forming a central portion of the C-shape, wherein the vertical handle portion is configured to run parallel to a height of the beverage can, and wherein the vertical handle portion comprises an internal facing surface proximal the beverage can when the beverage can handle device holds a beverage can and an external facing surface distal the beverage can when the beverage can handle device holds the beverage can; a top portion coupled to the vertical handle portion at a top end of the vertical handle portion and generally perpendicular to the vertical handle portion, wherein the top portion comprises an internal facing surface proximal the beverage can when the beverage can handle device holds a beverage can and an external facing surface distal the beverage can when the beverage can handle device holds a beverage can, and wherein the internal facing surface of the top portion comprises a notch configured to secure a top rim of the beverage can; and a base coupled to the vertical handle portion at a bottom end of the vertical handle portion and generally perpendicular to the vertical handle portion and generally parallel to the top portion, wherein the base comprises rotatably coupled first and second base members, wherein each of the first and second base members comprises two base extensions, wherein each base extension comprises an internal facing surface proximal the beverage can when the beverage can handle device holds the beverage can and an external facing surface distal the beverage can when the beverage can handle device holds the beverage can, and wherein the internal facing surface of each base extension comprises a first and a second raised portion forming a notch therebetween wherein the notch is configured to secure a bottom rim of the beverage can.

In some aspects of this embodiment, the vertical handle portion is configured to arc away from the beverage can, and in some aspects, the vertical handle portion may also comprise a pattern on a surface of the vertical handle portion, where the pattern comprises lettering such as for advertising or for the drinker's name or initials. In some aspects, the internal facing surface of the vertical handle portion comprises indentations to accommodate one or more of a drinker's fingers.

In some aspects of this embodiment, the rotatably coupled first and second base members form a generally linear base when the first and second base members are collapsed and wherein the rotatably coupled first and second base members form a generally X-shaped base when the first and second base members are expanded.

Also in some embodiments, the beverage can handle device is configured to hold 5.5 oz., 8 oz., 12 oz., 16 oz., 24 oz., or 40 oz. cans or in some embodiments the beverage can handle device is configured to hold 330 ml, 355 ml, 375 ml, 440 ml, 500 ml, and 568 ml cans.

Yet another embodiment provides a C-shaped beverage can handle device that may be removably attached to a beverage can comprising: a vertical handle portion forming a central portion of the C-shape, wherein the vertical handle portion is configured to run parallel to a height of the beverage can, and wherein the vertical handle portion comprises an internal facing surface proximal the beverage can when the beverage can handle device holds a beverage can and an external facing surface distal the beverage can when the beverage can handle device holds the beverage can; a top portion coupled to the vertical handle portion at a top end of the vertical handle portion and generally perpendicular to the vertical handle portion, wherein the top portion comprises an internal facing surface proximal the beverage can when the beverage can handle device holds a beverage can and an external facing surface distal the beverage can when the beverage can handle device holds a beverage can, and wherein the internal facing surface of the top portion comprises a notch configured to accommodate and removably secure a top rim of the beverage can; and a base coupled to the vertical handle portion at a bottom end of the vertical handle portion and generally perpendicular to the vertical handle portion and generally parallel to the top portion, wherein the base comprises rotatably coupled first and second base members, wherein each of the first and second base members comprises two base extensions, wherein each base extension comprises an internal facing surface proximal the beverage can when the beverage can handle device holds a beverage can and an external facing surface distal the beverage can when the beverage can handle device holds a beverage can, and wherein the internal facing surface of each base extension comprises a first and a second raised portion forming a notch configured to accommodate and removably secure a bottom rim of the beverage can.

In some aspects of this embodiment, the vertical handle portion is configured to arc away from the beverage can, and in some aspects, the vertical handle portion may also comprise a pattern on a surface of the vertical handle portion, where the pattern comprises lettering. In some aspects, the internal facing surface of the vertical handle portion comprises indentations to accommodate one or more of a drinker's fingers.

In some aspects, the rotatably coupled first and second base members form a generally linear base when the first and second base members are collapsed and wherein the rotatably coupled first and second base members form a generally X-shaped base when the first and second base members are expanded.

Other aspects or either embodiment provide a method of using the beverage can handle device comprising the steps of: placing the beverage can in the base of the beverage handle device when the base is in a collapsed configuration; rotating the first and second base members of the base away from one another to an expanded configuration, wherein the beverage can is secured in the notch in the internal facing surface of each of the base extensions; flexing the vertical handle portion to insert the top rim of the beverage can in the notch in the internal facing surface of the top portion of the beverage can handle device.

In some aspects of either embodiment, the beverage can handle device is fabricated in two sections, where the main section is fabricated in the C-shape comprising the top portion, vertical handle portion and first base member of the base, and where a small section is fabricated forming the second base member, and rotatably coupling the second section to the first base member of the main section.

In some aspects of either embodiment, the beverage can handle device is fabricated from plastics such as polylactic acid, polypropylene, polyethylene or polystyrene and in alternative aspects, the beverage can handle device is fabricated from metal or metal alloys such as aluminum. When fabricated in plastic, a 3D printer may be used.

These aspects and other features and advantages of the invention are described below in more detail.

BRIEF DESCRIPTION OF THE FIGURES

It should be understood that the drawings are not necessarily to scale.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. Moreover, all of the functionalities described in connection with one embodiment are intended to be applicable to the additional embodiments described herein except where expressly stated or where the feature or function is incompatible with the additional embodiments. For example, where a given feature or function is expressly described in connection with one embodiment but not expressly mentioned in connection with an alternative embodiment, it should be understood that the feature or function may be deployed, utilized, or implemented in connection with the alternative embodiment unless the feature or function is incompatible with the alternative embodiment.

Note that as used herein and in the appended claims, the singular forms "a," "an," and "the" include plural referents unless the context clearly dictates otherwise. Thus, for example, reference to "an oligonucleotide" refers to one or more oligonucleotides. Terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Unless defined otherwise, all technical terms used herein have the same meaning as commonly understood by one of ordinary skill in the art to which this invention belongs.

Where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either both of those included limits are also included in the invention.

In the following description, numerous specific details are set forth to provide a more thorough understanding of the present invention. However, it will be apparent to one of ordinary skill in the art that the present invention may be practiced without one or more of these specific details. In other instances, well-known features and procedures well known to those skilled in the art have not been described in order to avoid obscuring the invention.

The present disclosure provides a convenient reusable handle for a beverage can, which firmly holds the beverage can and makes it easy to carry. Conventional beverage cans do not offer a drinker a substantial grip; further, beverage can handles known the art fail to provide the drinker a comfortable handle with which to hold the can or a configuration that grasps the can securely and provides security from tipping or jostling. The beverage can handle device disclosed herein is easily attached to and detached from the beverage can and may be fabricated in different sizes to hold cans of different sizes, including but limited to holders for, e.g., 5.5 oz., 8 oz., 12 oz., 16 oz., 24 oz., and 40 oz. cans popular in the United States, as well as holders for 330 ml, 355 ml, 375 ml, 440 ml, 500 ml, and 568 ml cans popular in other countries.

The beverage can handle device comprises an upper or top portion, a middle or handle portion and a lower or base portion, where the shapes of the top and base portions of the beverage can handle device are matched to that of the top rim and bottom rim, respectively, of the beverage can, so as to engage and clasp securely the beverage can. The base of the beverage can handle device is configured to linearly traverse the bottom diameter of the beverage can in a single direction when the base is contracted and to linearly traverse the bottom diameter of the beverage can in two directions (e.g., substantially perpendicular directions) when the base is expanded in a "scissor hinge." The middle or handle portion or the beverage can holder may be generally arcuate in overall configuration so as to form the handle and be spaced away from the sidewall of the beverage can.

The beverage can handle typically is fabricated in two sections, with a main section formed in a "c-like configuration" forming the top portion, handle portion and first base member of the base, and a small section which forms the second base member that is rotatably coupled to the first base member of the main section. In the expanded position, the first base member and the second base member form a cross shape or "X" shape (e.g., a scissor hinge), while in the collapsed or contracted position, the first base member and the second base member form a linear shape.

The beverage can handle device is fabricated from a resilient material such as plastic or metal and is sufficiently rigid to support a full beverage can, yet be sufficiently flexible to permit attachment of the top portion and base of the beverage can handle device to the beverage can such that the top portion and base may grip the respective edges of the beverage can, then permit detachment of the beverage can handle device from the beverage can once the drinker is finished with the beverage. In operation, the beverage can is placed in the base of the beverage can holder device when the base is in the contracted configuration, the first and second base members are then rotated away from one another (that is, the first and second base members are pivoted from the linear, collapsed or contracted shape to form the "X", expanded shape) to secure the bottom of the can, and the middle/handle portion is slightly flexed sufficient to insert the top rim of the beverage can into the notch on the top portion of the beverage can holder device. Detachment of the beverage can from the beverage can holder device is simply the reverse of this process.

One clear advantage to the beverage can holder device described herein is that because beverage cans are metal, the can itself transfers heat or cold readily; thus, a beverage can that has been chilled will feel cold to the hand, which may be unpleasant to the drinker, and the warmth of the drinkers hand will warm the beverage more quickly. The beverage handle described herein allows the drinker to avoid directly holding the cold beverage and prevents the beverage in the can to warm faster than the drinker might desire; further, the beverage can handle device provides stability to the beverage can by providing a large, solid base.

Figure 1:
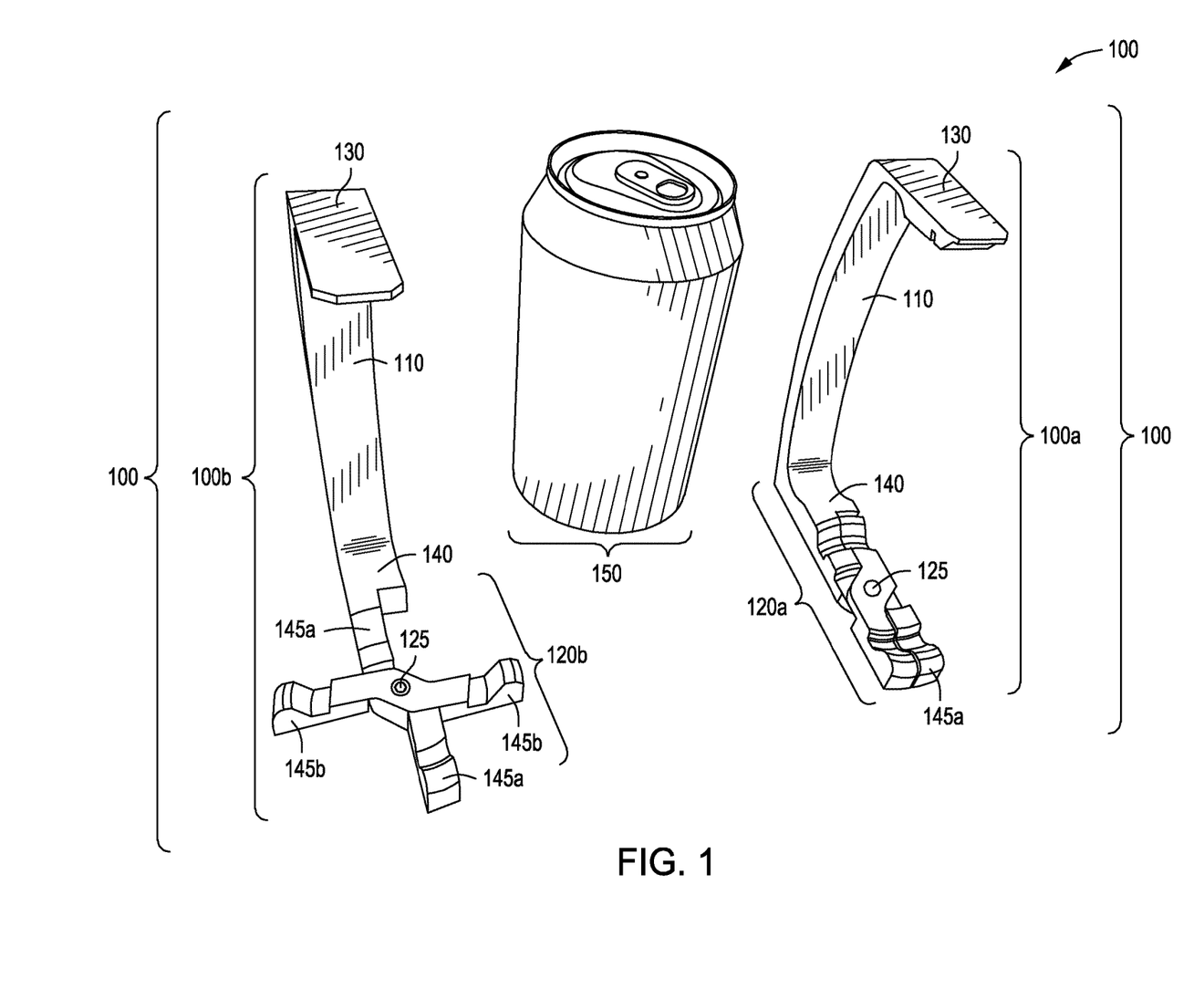
FIG. 1 illustrates an exemplary embodiment of the presently described beverage can handle and a typical beverage can. The beverage can handle is shown with the base expanded (left) and contracted (right).

FIG. 1 illustrates an exemplary embodiment of the presently described beverage can handle device 100 and a typical beverage can 150. The beverage can handle device 100 is shown as a beverage can handle device with the base expanded 100b (left) and a beverage can handle device with the base contracted 100a (right). The beverage can handle devices 100a and 100b each comprise a handle portion 110, a top portion or "arm" 130 and a base 120—either a base in a contracted position 120a or a base in an expanded position 120b—wherein the base 120 comprises a rotatable coupling 125, which couples a first base member 145a to a second base member 145b (seen where the base member is in an expanded position 120b) as well as a base/handle junction region 140. When the base is in a contracted position 120a, first base member 145a and second base member 145b are contracted or collapsed 145c by rotating second base member 145b toward and adjacent to first base member 145a via rotatable coupling 125.

Figure 2:
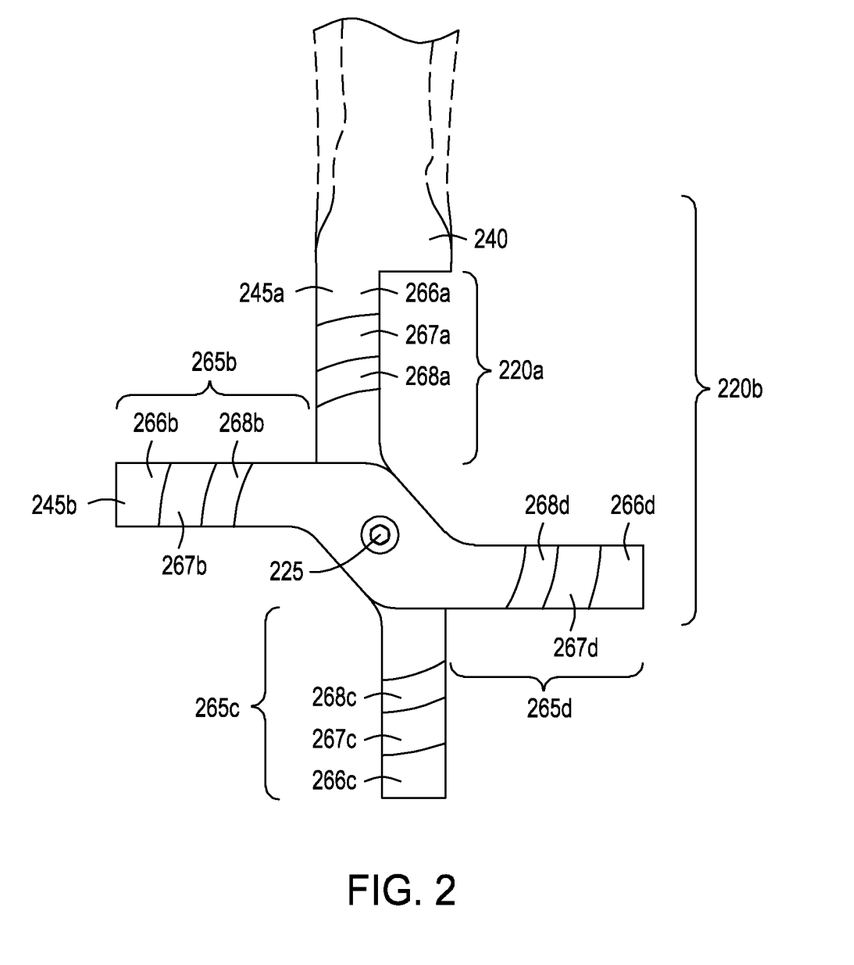
FIG. 2 provides a view of the bottom of a base of an exemplary beverage can handle in an expanded position.

FIG. 2 provides a view of the bottom of a base (generally 220) of an exemplary beverage can handle device in an expanded position 220b. Seen are base extensions 265a, 265b, 265c and 265d, where base extensions 265a and 265c form first base member 245a (that is, base extensions 265a and 265c together form substantially linear base member 245a) and base extensions 265b and 265d form second base member 245b (that is, base extensions 265b and 265d together form substantially linear base member 245b). First base member 245a and second base member 245b are rotatably coupled by coupling 225 (as described above) and in an expanded configuration (shown in this FIG. 2) generally form a cross- or "X"-shaped base and in a contracted or collapsed configuration (not shown in this FIG. 2 but see FIG. 1 left) generally form a linear-shaped base.

Figure 5:
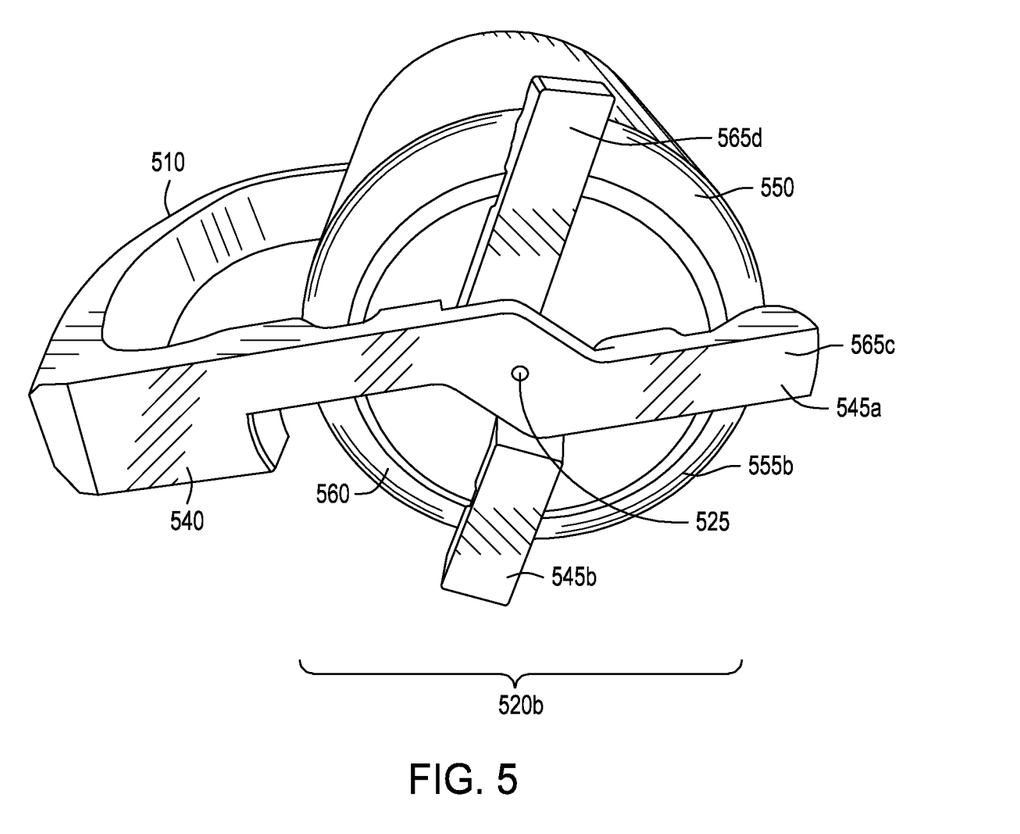
FIG. 5 provides a bottom view of a base portion of a beverage can handle device and can assembly.

Each of the base extensions comprises regions that allow engagement of the base 220b with the bottom rim of the beverage can (not shown in this FIG. 2 but see FIG. 5). Base extension 265a comprises a distal raised portion 266a of base extension 265a (where distal refers to the position on base extension 265a from coupling 225), a notch portion 267a of base extension 265a configured to engage with the bottom rim of the beverage can, and a proximal raised portion 268a of base extension 265a (where proximal refers to the position on base extension 265a from coupling 225). Base extension 265b comprises a distal raised portion 266b of base extension 265b (where distal refers to the position on base extension 265b from coupling 225), a notch portion 267b of base extension 265b configured to engage with the bottom rim of the beverage can, and a proximal raised portion 268b of base extension 265b (where proximal refers to the position on base extension 265b from coupling 225). Base extension 265c comprises a distal raised portion 266c of base extension 265c (where distal refers to the position on base extension 265c from coupling 225), a notch portion 267c of base extension 265c configured to engage with the bottom rim of the beverage can, and a proximal raised portion 268c of base extension 265c (where proximal refers to the position on base extension 265c from coupling 225). Base extension 265d comprises a distal raised portion 266d of base extension 265d (where distal refers to the position on base extension 265d from coupling 225), a notch portion 267d of base extension 265d configured to engage with the bottom rim of the beverage can, and a proximal raised portion 268d of base extension 265d (where proximal refers to the position on base extension 265d from coupling 225). Also seen is the base/handle junction 240 of the beverage can handle. The distal and proximal raised portions define the notch portions, and it is the notch portions into which the bottom rim of the beverage can is lodged.

Figure 3:
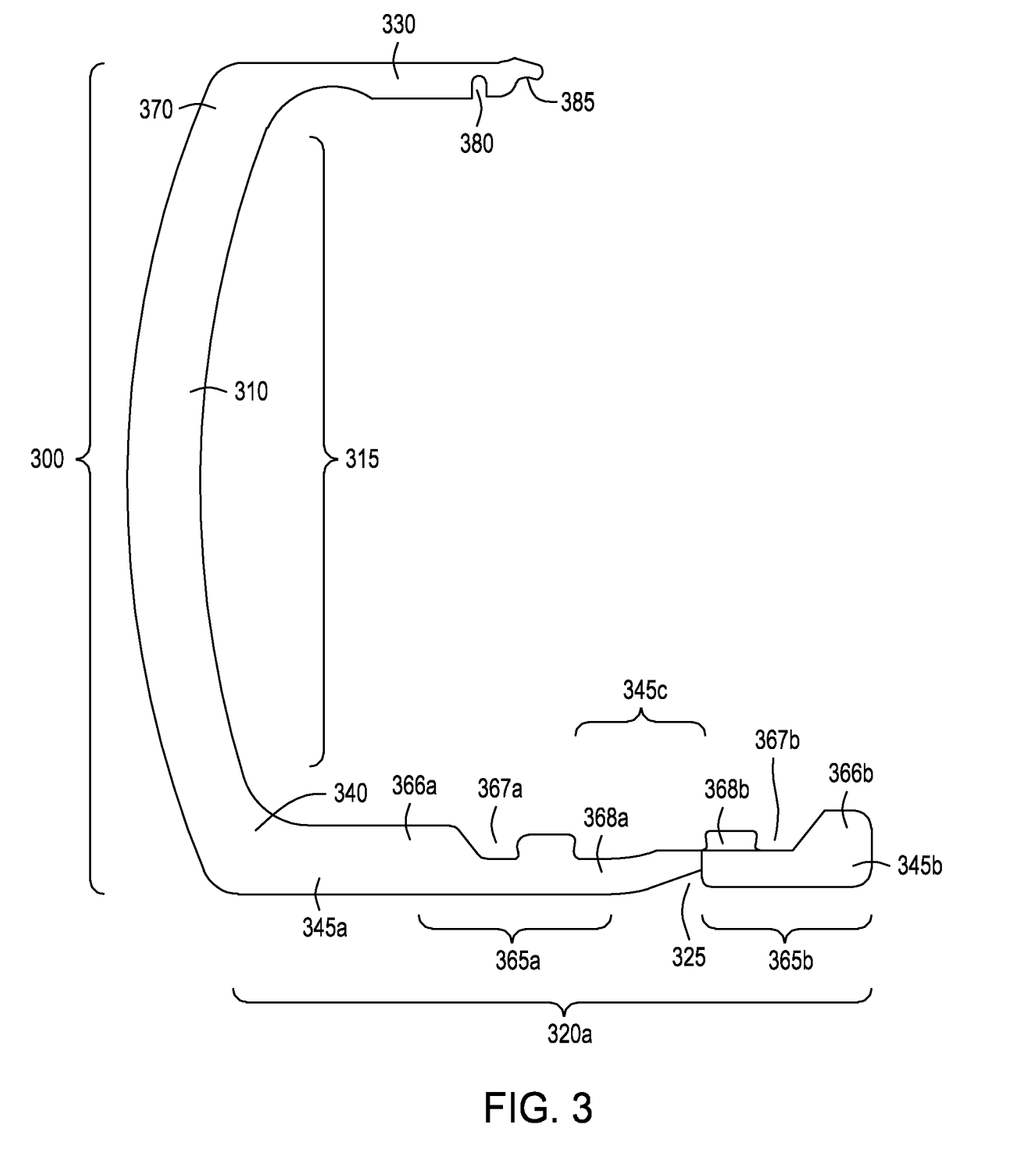
FIG. 3 provides a side view of an exemplary beverage can handle positioned so as to hold a typical beverage can.

FIG. 3 provides a side view of an exemplary beverage can handle device 300 with the base member in a contracted position 320a. Note the general "C" configuration of beverage can handle device 300. Beverage can handle device 300 comprises handle portion 310 which forms a vertical portion of beverage can handle device 300 and which runs parallel to the beverage can (not seen in this FIG. 3). Handle portion 310 in this embodiment is slightly arcuate in overall configuration, arcing and spaced away from the sidewall of the beverage can (beverage can not shown in this FIG. 3). Handle member 310 optionally may comprise a surface pattern or raised markings (not shown) to enhance a drinker's grip on the handle, or lettering to denote the manufacturer or to advertise, e.g., a particular brand of beverage or to provide the name or initials of the drinker. Also optionally, the surface of handle portion 310 proximal the beverage can may comprise indentations to accommodate a drinker's fingers so as to enhance the drinker's grip on the beverage can handle device. The beverage can handle device 300 comprises a base/handle junction 340, where the generally vertical handle portion 310 is contiguous with contracted base portion 320a, where contracted base portion 320a is generally perpendicular to handle portion 310.

Collapsed base member 320a comprises both first base member 345a and second base member 345b (in this FIG. 3, collapsed into a generally linear configuration); with base extension 365a of first base member 345a and base extension 365b of second base member 365b seen, where first base member 345*a* and second base member 345*b* are rotated together via rotatable coupling 325 to collapse the first base member 345*a* and second base member 345*b* to form collapsed or contracted base member 345*c*. Base extension 365*a* of first base member 345*a* shows in profile the following regions of base extension 365*a*: distal raised portion 366*a* of base extension 365*a* (where distal refers to the position on base extension 365*a* from coupling 325), notch 367*a* of base extension 365*a*, and proximal raised portion 368*a* of base extension 365*a* (where proximal refers to the position on base extension 365*a* from coupling 325). Base extension 365*b* of first base member 345*b* shows in profile the following regions of base extension 365*b*: distal raised portion 366*b* of base extension 365*b* (where distal refers to the position on base extension 365*b* from coupling 325), notch 367*b* of base extension 365*b*, and proximal raised portion 368*b* of base extension 365*b* (where proximal refers to the position on base extension 365*a* from coupling 325). Again, the distal and proximal raised portions of each base extension define the notches of each base extension, and it is the notches into which the bottom rim of the beverage can is lodged and secured.

The top portion or "arm" 330 of beverage can handle device 300 is generally perpendicular to handle portion 310 (and generally parallel to collapsed base 320*a*), again, forming general "C" configuration of the beverage can handle device 330. Top portion 330 of beverage can handle device 300 comprises notch 380 and optional protrusion 385. Notch 380 is configured to securely engage the top rim of the beverage can (not shown in this FIG. 3).

Figure 4:
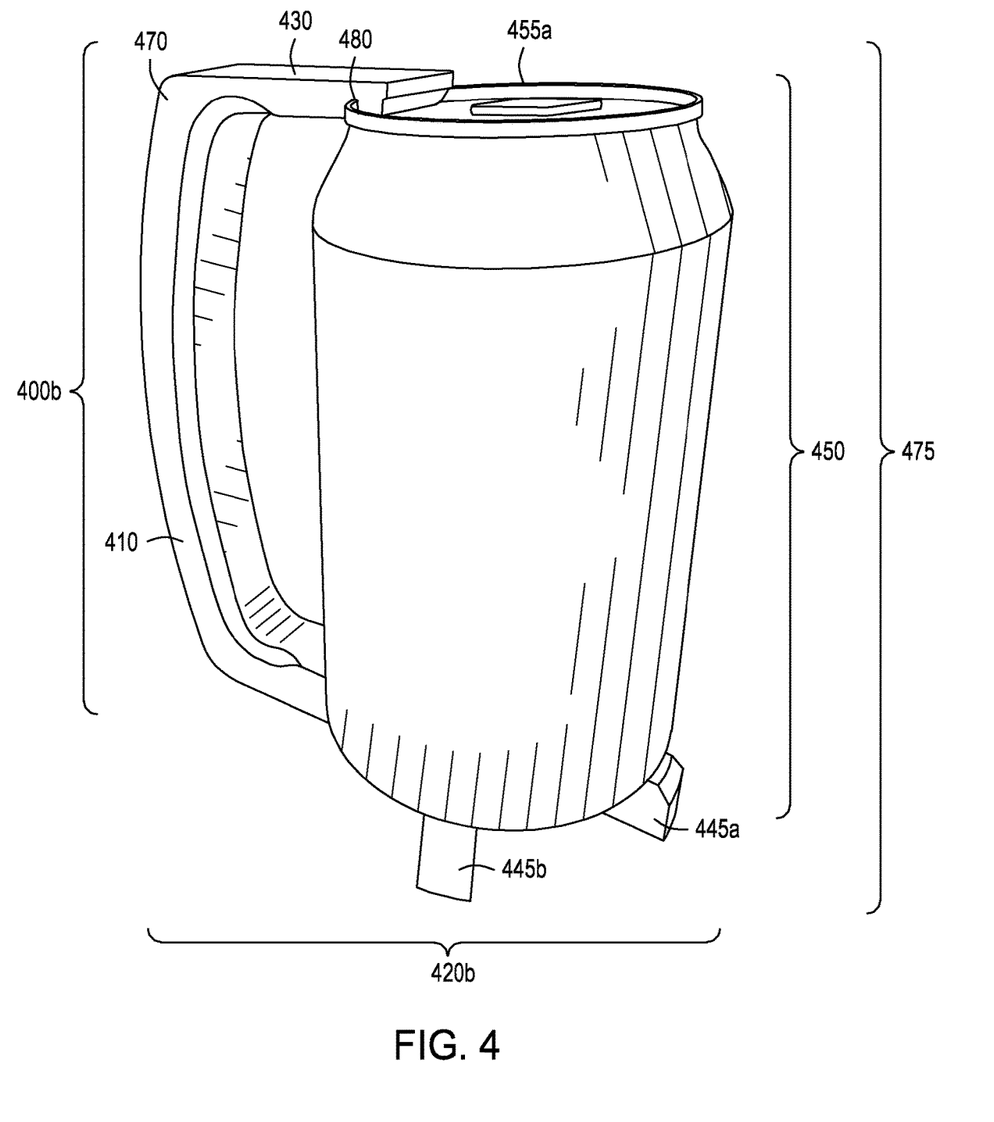
FIG. 4 provides a side view of an exemplary beverage can handle with the base in a contracted position.

FIG. 4 provides a side view of an exemplary beverage can handle device 400*b* with the base in an expanded position 420*b* so as to engage the notches in the base extensions and hold a typical beverage can 450. Seen in this illustration of the combination beverage can handle device and beverage can 475 is first base member 445*a* and second base member 445*b* grasping and supporting the bottom of can 450; handle portion 410; can rim top 455; top portion or arm 430 of beverage can handle device 400*b*; and notch 480 in the top portion or arm 430 of beverage can handle device 400*b*. Notch 480 engages with the can rim top 455 of can 450 to grasp and support the top of can 450, while first base portion 445*a* and second base portion 445*b* grasp and support the bottom of can 450.

FIG. 5 provides a bottom view of the base of a beverage can handle device and can assembly 575 comprising exemplary beverage can handle device 520*b* with the first base member 545*a* and second base member 545*b* in an expanded position holding a typical beverage can 550 by engaging with can rim bottom 560. In this view, base extensions 565*a*, 565*b*, 565*c* and 565*d* are seen in a cross or "X" configuration supporting the bottom of can 550, where second base member 545*b* can be swiveled or rotated with first base member 545*a* via coupling 525 to expand the base member of beverage can handle device 520*b* or to contract the base member of beverage can handle device (the contracted beverage can handle device is not seen in this FIG. 5, but see FIG. 1 left). Also seen in this view is the handle portion 510 of beverage can handle 520*b*, base/handle junction 540.

While this invention is satisfied by embodiments in many different forms, as described in detail in connection with preferred embodiments of the invention, it is understood that the present disclosure is to be considered as exemplary of the principles of the invention and is not intended to limit the invention to the specific embodiments illustrated and described herein. Numerous variations may be made by persons skilled in the art without departure from the spirit of the invention. The scope of the invention will be measured by the appended claims and their equivalents. The abstract and the title are not to be construed as limiting the scope of the present invention, as their purpose is to enable the appropriate authorities, as well as the general public, to quickly determine the general nature of the invention. In the claims that follow, unless the term "means" is used, none of the features or elements recited therein should be construed as means-plus-function limitations pursuant to 35 U.S.C. § 112, ¶ 6.

I claim:

1. A C-shaped beverage can handle device that may be removably attached to a beverage can comprising:
   a vertical handle portion forming a central portion of the C-shape, wherein the vertical handle portion is configured to run parallel to a height of the beverage can, and wherein the vertical handle portion comprises an internal facing surface proximal the beverage can when the beverage can handle device holds the beverage can and an external facing surface distal the beverage can when the beverage can handle device holds the beverage can;
   a top portion coupled to the vertical handle portion at a top end of the vertical handle portion and generally perpendicular to the vertical handle portion, wherein the top portion comprises an internal facing surface proximal the beverage can when the beverage can handle device holds the beverage can and an external facing surface distal the beverage can when the beverage can handle device holds the beverage can, and wherein the internal facing surface of the top portion comprises a notch configured to secure a top rim of the beverage can; and
   a base coupled to the vertical handle portion at a bottom end of the vertical handle portion and generally perpendicular to the vertical handle portion and generally parallel to the top portion, wherein the base comprises rotatably coupled first and second base members, wherein each of the first and second base members comprises two base extensions, wherein each base extension comprises an internal facing surface proximal the beverage can when the beverage can handle device holds the beverage can and an external facing surface distal the beverage can when the beverage can handle device holds the beverage can, and wherein the internal facing surface of each base extension comprises a first and a second raised portion forming a notch therebetween wherein the notch is configured to secure a bottom rim of the beverage can.

2. The beverage can handle device of claim 1, wherein the vertical handle portion is configured to arc away from the beverage can.

3. The beverage can handle device of claim 1, wherein the vertical handle portion comprises a pattern on a surface of the vertical handle portion.

4. The beverage can handle device of claim 3, wherein the pattern comprises lettering.

5. The beverage can handle device of claim 1, wherein the internal facing surface of the vertical handle portion comprises indentations to accommodate one or more of a drinker's fingers.

6. The beverage can handle device of claim 1, wherein the rotatably coupled first and second base members form a generally linear base when the first and second base members are collapsed and wherein the rotatably coupled first and second base members form a generally X-shaped base when the first and second base members are expanded.

7. The beverage can handle device of claim 1, wherein the beverage can handle device is configured to hold 5.5 oz., 8 oz., 12 oz., 16 oz., 24 oz., or 40 oz. cans.

8. The beverage can handle device of claim 7, wherein the beverage can handle device is configured to hold 5.5 oz. cans.

9. The beverage can handle device of claim 7, wherein the beverage can handle device is configured to hold 8 oz. cans.

10. The beverage can handle device of claim 7, wherein the beverage can handle device is configured to hold 12 oz. cans.

11. The beverage can handle device of claim 7, wherein the beverage can handle device is configured to hold 40 oz. cans.

12. The beverage can handle device of claim 1, wherein the beverage can handle device is configured to hold 330 ml, 355 ml, 375 ml, 440 ml, 500 ml, and 568 ml cans.

13. The beverage can handle device of claim 12, wherein the beverage can handle device is configured to hold 330 ml cans.

14. The beverage can handle device of claim 12, wherein the beverage can handle device is configured to hold 375 ml cans.

15. The beverage can handle device of claim 12, wherein the beverage can handle device is configured to hold 440 ml cans.

16. The beverage can handle device of claim 12, wherein the beverage can handle device is configured to hold 500 ml cans.

17. The beverage can handle device of claim 12, wherein the beverage can handle device is configured to hold 568 ml cans.

18. A C-shaped beverage can handle device that may be removably attached to a beverage can comprising:
   a vertical handle portion forming a central portion of the C-shape, wherein the vertical handle portion is configured to run parallel to a height of the beverage can, and wherein the vertical handle portion comprises an internal facing surface proximal the beverage can when the beverage can handle device holds the beverage can and an external facing surface distal the beverage can when the beverage can handle device holds the beverage can;
   a top portion coupled to the vertical handle portion at a top end of the vertical handle portion and generally perpendicular to the vertical handle portion, wherein the top portion comprises an internal facing surface proximal the beverage can when the beverage can handle device holds the beverage can and an external facing surface distal the beverage can when the beverage can handle device holds the beverage can, and wherein the internal facing surface of the top portion comprises a notch configured to accommodate and removably secure a top rim of the beverage can; and
   a base coupled to the vertical handle portion at a bottom end of the vertical handle portion and generally perpendicular to the vertical handle portion and generally parallel to the top portion, wherein the base comprises rotatably coupled first and second base members, wherein each of the first and second base members comprises two base extensions, wherein each base extension comprises an internal facing surface proximal the beverage can when the beverage can handle device holds the beverage can and an external facing surface distal the beverage can when the beverage can handle device holds the beverage can, wherein the internal facing surface of each base extension comprises a first and a second raised portion forming a notch configured to accommodate and removably secure a bottom rim of the beverage can, and wherein the rotatably coupled first and second base members form a generally linear base when the first and second base members collapsed and wherein the rotatably coupled first and second base members form a generally X-shaped base when the first and second base members are expanded.

19. The beverage can handle device of claim 18, wherein the vertical handle portion is configured to arc away from the beverage can.

20. The beverage can handle device of claim 18, wherein the vertical handle portion comprises a pattern on a surface of the vertical handle portion.

21. The beverage can handle device of claim 20, wherein the pattern comprises lettering.

22. The beverage can handle device of claim 18, wherein the internal facing surface of the vertical handle portion comprises indentations to accommodate one or more of a drinker's fingers.

23. A method of using the beverage can device of claim 18 comprising the steps of:
   placing the beverage can in the base of the beverage handle device when the base is in a collapsed configuration;
   rotating the first and second base members of the base away from one another to an expanded configuration, wherein the beverage can is secured in the notch in the internal facing surface of each of the base extensions;
   flexing the vertical handle portion to insert the top rim of the beverage can in the notch in the internal facing surface of the top portion of the beverage can handle device.

24. The beverage can handle device of claim 18, wherein the beverage can handle device is fabricated in two sections, wherein the main section is fabricated in the C-shape comprising the top portion, vertical handle portion and first base member of the base, and wherein a small section is fabricated forming the second base member, and rotatably coupling the second section to the first base member of the main section.

25. The beverage can handle device of claim 24, wherein the beverage can handle device is fabricated from plastic.

26. The beverage can handle device of claim 25, wherein the plastic is selected from the group of polylactic acid, polypropylene, polyethylene or polystyrene.

27. The beverage can handle device of claim 26, wherein the beverage can handle device is fabricated using a 3D printer.

28. The beverage can handle device of claim 24, wherein the beverage can handle device is fabricated from metal.

29. The beverage can handle device of claim 28, wherein the beverage can handle device is fabricated from aluminum.

* * * * *